United States Patent [19]
Tuinenga

[11] Patent Number: 5,893,123
[45] Date of Patent: Apr. 6, 1999

[54] SYSTEM AND METHOD OF INTEGRATING A SPREADSHEET AND EXTERNAL PROGRAM HAVING OUTPUT DATA CALCULATED AUTOMATICALLY IN RESPONSE TO INPUT DATA FROM THE SPREADSHEET

[76] Inventor: Paul W. Tuinenga, 105 Deeley Ct., Folsom, Calif. 95630

[21] Appl. No.: 493,487

[22] Filed: Jun. 22, 1995

[51] Int. Cl.[6] .................................................. G06F 17/30
[52] U.S. Cl. ............................................ 707/504; 707/503
[58] Field of Search ................................... 707/503, 504; 395/680, 682

[56] References Cited

U.S. PATENT DOCUMENTS

| | | | |
|---|---|---|---|
| 5,079,695 | 1/1992 | Dysart et al. | 395/680 |
| 5,303,146 | 4/1994 | Ammirato et al. | 707/503 |
| 5,315,703 | 5/1994 | Metheny et al. | 345/507 |
| 5,317,686 | 5/1994 | Salas et al. | 707/503 |
| 5,339,410 | 8/1994 | Kanai | 707/100 |
| 5,381,524 | 1/1995 | Lewis et al. | 707/503 |
| 5,418,902 | 5/1995 | West et al. | 707/503 |
| 5,485,569 | 1/1996 | Goldman et al. | 707/507 |
| 5,610,833 | 3/1997 | Chang et al. | 364/491 |

FOREIGN PATENT DOCUMENTS

WO9324896 12/1993 WIPO.

OTHER PUBLICATIONS

Gomez, Dick. "The Evolution of EDA Tools: What Does the Future Hold?" Printed Circuit Design: 18–22, Nov. 1994.

Michael J. Miller, "Getting It Together", PC Magazine, p. 110, Feb. 8, 1994.

*Primary Examiner*—Joseph H. Feild
*Assistant Examiner*—John L. Young
*Attorney, Agent, or Firm*—Knobbe, Martens Olson and Bear, LLP

[57] ABSTRACT

A system and method integrate a spreadsheet and an externally implemented program. The system includes a set of input cells in the spreadsheet, which contain input data for the external program; a set of transmission functions which reference the input cells; and a set of retrieval functions, which reference the transmission functions. A spreadsheet evaluation sequencer, which is part of the spreadsheet program, schedules execution of the transmission functions whenever input data changes, and schedules execution of the retrieval functions after the transmission functions have been executed, thereby effecting a seamless, two-way link between the spreadsheet and external program.

25 Claims, 5 Drawing Sheets

SYSTEM AND METHOD OF INTEGRATING A SPREADSHEET AND EXTERNAL PROGRAM HAVING OUTPUT DATA CALCULATED AUTOMATICALLY IN RESPONSE TO INPUT DATA FROM THE SPREADSHEET

FIELD OF THE INVENTION

This invention relates to a system and method for integrating a spreadsheet program and an externally implemented program. More particularly, this invention relates to a system and method for providing a seamless, two-way link between a spreadsheet program and an input dependent external program such that the external program draws input from and produces output to the spreadsheet.

BACKGROUND OF THE INVENTION

Spreadsheet programs are commonly used for mathematical and database applications such as record-keeping, "what-if" and optimization analysis, engineering and financial calculations, and, recently, charting and graphical analysis. Because of the demands placed on spreadsheet programs by this wide variety of applications, spreadsheet programs have evolved from the relatively simple concept of a single worksheet divided into a grid of cells, into multiple worksheets capable of referencing each other and using complex macros to execute procedures not easily implemented through cell-based functions.

The recent trend toward "component" software and integrated programs, moreover, has spurred the development of spreadsheet programs and "objects" that can communicate with external programs via interprocess communication facilities such as dynamic data exchange protocols and remote procedure calls. Spreadsheet programs capable of such interprocess communication can, for example, export "live" data from a worksheet to a document created in a word processing program. If the data in the worksheet changes, it changes in the document as well. Similarly, a worksheet may import "live" data obtained from an external database through interprocess communication. If the data in the database changes, the change will appear in the worksheet. Generally, these links between the spreadsheet and external programs are one-way: data is either sent to the external program or received from it, but not both.

It is highly desirable to create a two-way link to the external program, so that the external program can receive input data from one part of the spreadsheet, and produce output data, based upon the input data, to another part of the spreadsheet. (This type of external program is termed an "input dependent" external program in this specification.) Integrating an input dependent program with a spreadsheet would enable the spreadsheet to manipulate the inputs of the external program, and simultaneously to chart, display, and use the outputs of the external program.

An excellent example of an input dependent program that could benefit from integration with a spreadsheet is an electronic circuit simulator program. Circuit simulators are used to evaluate numerical models of electronic circuits. Typically, these simulators are designed to read a text file containing a description of the circuit model and values for the circuit's components, such as the resistance of resistors or the capacitance of capacitors. The simulator evaluates the model and produces output data representing, for example, the DC voltage at certain nodes in the model. To change the model, the user must edit the text file and re-run the simulator. This process is cumbersome and is not easily automated. If, instead, the simulator could be integrated with a spreadsheet, the input values of the circuit components could be defined in cells within the spreadsheet, and the desired output information could be retrieved as functions stored in other cells within the spreadsheet. In this way, the user could change the model simply by changing the input values in the spreadsheet. More importantly, spreadsheet functions could be applied to the circuit model so that, for example, (1) algorithms for evaluating the circuit model for a range of input values could be set up within the spreadsheet, automating the simulation process; (2) spreadsheet-based goal-seeking and optimization algorithms could be used to modify the circuit model input values until a desired output is reached; (3) the results of one simulation could be used as the inputs to another simulation; or (4) the spreadsheet could be used to chart and plot the output data from the simulator.

Moreover, it is highly desirable to create a "seamless" two-way link between the spreadsheet and the external program, so that the two appear to be fully integrated. In such a seamless integration, the transfer of data to and from the external program would appear to be completely automatic, occurring in the normal course of the spreadsheet's recalculation. In addition, such a "seamless" two-way link between the spreadsheet and external program would allow the user to place input data for the external program in worksheet cells separate from other worksheet cells where output from the program is desired. For example, the user might wish to place input data for the external program in a range of cells in the upper left corner of the worksheet, perhaps in a table format. The user might also wish to place output data from the external program in one or more cells at the bottom of the worksheet, so that the outputs appear below the table. Seamlessly linking the spreadsheet and external program would allow the user to accomplish this easily, and furthermore would spare the user the unenviable and error-prone task of identifying all of the input data to the external program as arguments of his output functions. In other words, the user would not be required to write output functions such as GetExternalProgramOutput( WhatOutput, cell1, cell2, cell3, cell4)

where WhatOutput specifies the type of output desired, and cell1 ... cell4 specify the locations of (or data contained in) the cells holding input data for the external program. (Worse still, the user would have to use such verbose functions in every location where he desires output.) Instead, the user might merely write a function such as GetExternalProgramOutput( WhatOutput)

to retrieve the program's output. The seamless link between the spreadsheet and program would take care of providing the external program with the proper input data.

In order to create such a seamless integration, it is necessary to ensure that the spreadsheet transfers input data to the external program automatically, whenever that data is changed in the spreadsheet. Equally importantly, it is necessary to ensure that input data is sent before output data is requested from the external program. Otherwise, the external program will execute using old input data, and will likely produce incorrect output data.

In normal operation, spreadsheet programs use an "evaluation sequencer," a function that ensures that the functions in the worksheet operate on the correct data, and that all of the proper cells are reevaluated whenever data in the worksheet changes. The evaluation sequencer determines, in advance of any recalculation, which functions depend upon (i.e., have as arguments) the changed cell or cells in the worksheet, and which functions depend upon those functions, and so on. (Normally, these functions are contained in cells; but in many advanced spreadsheet programs, the functions may be contained in macros or other structures, as well). The spreadsheet program then evaluates the dependent functions in the order of their dependency.

Similarly, were the spreadsheet to use interprocess communication to transmit and retrieve live data, the spreadsheet program's evaluation sequencer would schedule the evaluation of any transmission and retrieval functions within the worksheet according to its normal rules of precedence-that is, the transmission and retrieval functions would be evaluated whenever the cells they depend upon change. It is therefore necessary to ensure that the spreadsheet program recognizes the data dependencies of the retrieval functions in the worksheet, so that they will not be evaluated before the transmission functions are evaluated. In this manner, the user may be assured that the external program operates on the correct input data before providing output to the spreadsheet.

There is thus a need for a seamless two-way link between an input dependent external program and a spreadsheet, such that the transfer of input data to the external program occurs automatically whenever the input data changes within the spreadsheet, and such that the retrieval of output data from the external program occurs after the input data has been transmitted.

SUMMARY OF THE INVENTION

The system and method of the present invention are for use with a spreadsheet program and an external program. The system comprises (1) an input cell in the spreadsheet, which contains input data for use by the external program; (2) a transmission function which contains a reference (usually as an argument of the function) to the input cell; and (3) a retrieval function which contains a reference to the transmission cell. The transmission function, when executed, transmits the data from the input cell to the external program. Similarly, the retrieval function, when executed, queries the external program for output data. Because spreadsheet programs use an "evaluation sequencer" to determine the order of calculation of functions in the spreadsheet, and because the evaluation sequencer operates by determining the order in which functions depend upon one another, the spreadsheet program will, when it notes that the data in the input cell has changed, first evaluate the transmission function (causing the input data to be sent to the external program), and then evaluate the retrieval function (requesting output data from the external program). In this way, the invention provides the significant advantage of ensuring-without any effort on the user's part-that any changed input data is provided to the external program, before any output is requested. The user may thus be assured that the output of the external program is based upon current input data.

Similarly, the method of this invention comprises the steps of making a first function call from the spreadsheet program to the external program, transmitting input data to the external program, and then making a second function call from the spreadsheet program to the external program, retrieving output data from the external program. Because the transmission step always precedes the retrieval step, the user is assured that the external program executes using the most current input data.

In accordance with another purpose of the invention, the transmission and retrieval functions are implemented using Microsoft® Object Linking and Embedding™ (OLE) function calls. The Microsoft® OLE system provides the advantage of allowing the spreadsheet program to communicate with the external program in a variety of ways, all of which are mediated by the OLE system and therefore do not require significant effort on the part of the programmer to implement. Moreover, the OLE system allows these function calls to take place as remote procedure calls, direct function calls, or even remote function calls across a network.

In accordance with yet another purpose of this invention, the transmission function is replaced with a notification function, which similarly is evaluated whenever input data is changed within the spreadsheet. The notification function alerts the external function that its input data has changed. Furthermore, because the notification function (like the transmission function) will automatically be evaluated by the spreadsheet program before the retrieval function is evaluated, the user is assured that the external program will recognize that its input data has changed (and then retrieve the current input data) before any output is returned.

DETAILED DESCRIPTION OF THE PREFERRED EMBODIMENT

Overview

Figure 1:
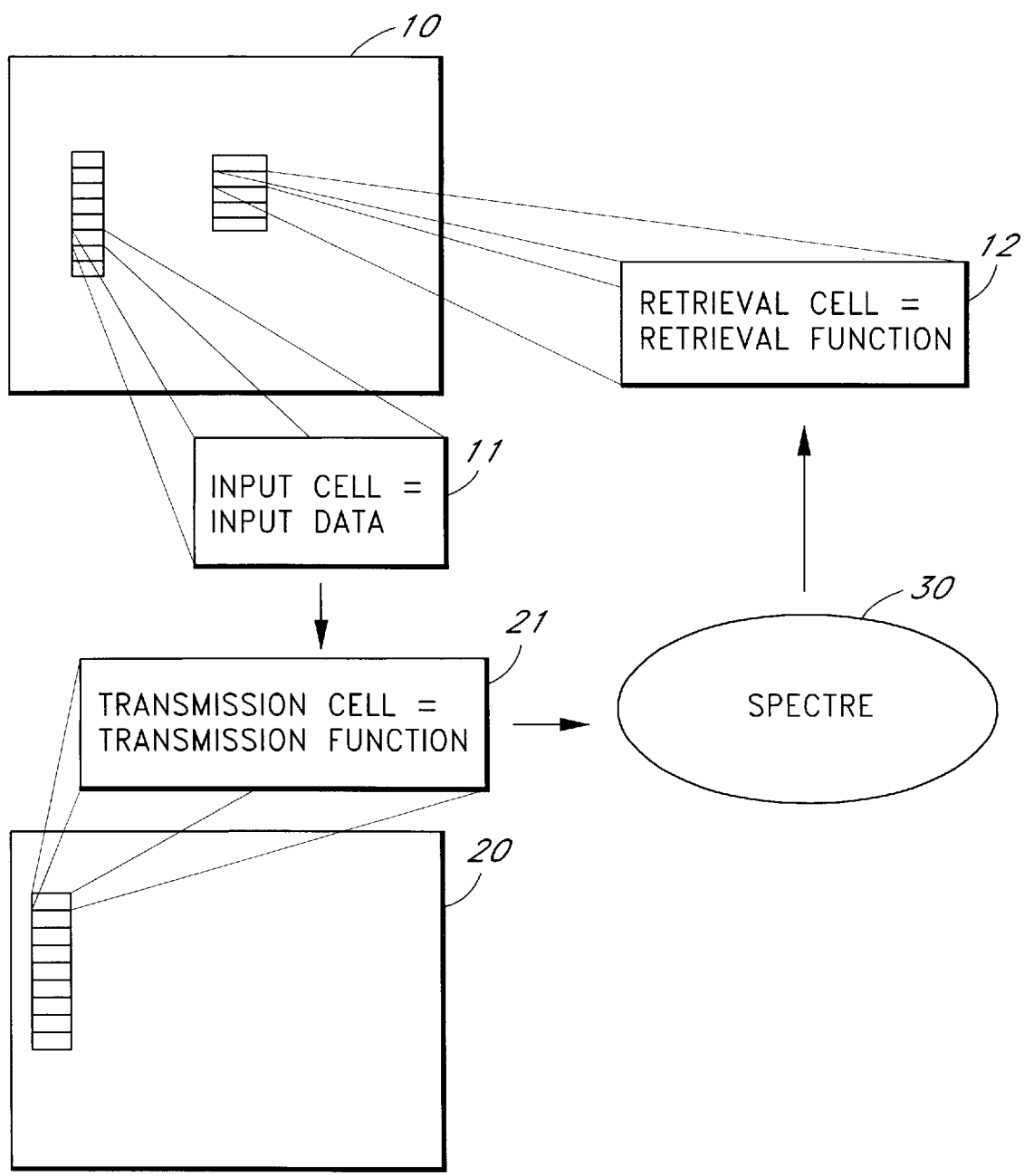
FIG. 1 is a schematic block diagram showing the relationships between the worksheet, "hidden" worksheet, and external program of the preferred embodiment of this invention.

The schematic block diagram shown in FIG. 1 provides an overview of the preferred embodiment of this invention. As FIG. 1 shows, the preferred embodiment comprises a main worksheet 10 created within a spreadsheet program; a "hidden" worksheet 20 also created within the spreadsheet program (the worksheet is "hidden" from the user so that the user is not tempted to change it, because it is for only the system's use); and an external input dependent program 30. The main worksheet 10 contains one or more input cells 11, which hold input values (either raw data, or the results of a spreadsheet function) that are to be used by the external program 30. The worksheet 10 also contains one or more retrieval cells 12, which retrieve output data from the external program 30. As will be described more fully below, the hidden worksheet 20 contains one or more transmission cells 21 which correspond to the input cells 11. Each transmission cell 21 provides the basic service of transmitting the value contained in its corresponding input cell 11 to the external program 30, whenever the value in the input cell 11 is changed.

In the preferred embodiment of this invention, the spreadsheet program is Microsoft® Excel™ 5.0. The external program 30 is a circuit simulator program called SPECTRE. SPECTRE is a public domain circuit simulator developed by the Electrical Engineering and Computer Science (EECS) department of the University of California at Berkeley. The program and its documentation may be obtained from the EECS department at U.C. Berkeley. To enhance the understanding of this invention, a brief discussion of the SPECTRE program follows.

SPECTRE

SPECTRE is a circuit simulator program that performs, among other things, DC (also known as "bias-point") analysis and AC (also known as "small signal") analysis on numerical models of electronic circuits. In its normal operation, SPECTRE reads a text file that contains a description of the circuit. The text file contains a description of each component in the circuit: its name, the names of the nodes the component is attached to, the type of device it is (e.g., a resistor), a model description for more complex devices (e.g., a transistor), and parameter values for the device (e.g., its resistance, if the device is a resistor). For example, the line R17 input ground resistor r=1K would specify a resistor named R17, located between the input and ground nodes of the circuit, having a resistance of 1,000 ohms.

Later lines in the text file direct SPECTRE to perform analyses on the modeled circuit and/or alter certain parameter values. For example, the line dcPoint DC start=3 stop=3 sweep=vcc lin=1 would direct SPECTRE to determine the DC voltage at all nodes, and output the result. The line setRes alter dev=R17 param="r" value=2000 would direct SPECTRE to change component R17's resistance to 2,000 ohms. Of course, such "alter" commands are followed by later lines directing SPECTRE to perform analyses on the altered circuit model.

The SPECTRE program operates by first reading the initial "circuit description" portion of the text file and constructing an "evaluation model" of the circuit (consisting of matrices of component parameters, look-up tables for device characteristics, and other structures that enable numerical analysis of the circuit model). The program then continues reading the text file for analysis and parameter altering commands, performing the desired analyses and altering component parameters, as instructed. The output generated by each circuit analysis is sent to a data file, for later viewing by a viewer program, such as the "Nutmeg" program made available by the EECS department at the University of California at Berkeley.

Integrating SPECTRE and Excel™

In the preferred embodiment of this invention, the SPECTRE program (or, indeed, any other input dependent program) is integrated with a spreadsheet program (for example, Microsoft® Excel™, so that SPECTRE takes its input parameters from cells in the worksheet, and so that the output of a SPECTRE analysis can be retrieved by functions located in other cells in the worksheet.

The preferred embodiment is best described by identifying the steps taken by a user who wishes to integrate the SPECTRE program with a spreadsheet.

In order to obtain a convenient interface to SPECTRE, and to facilitate linking SPECTRE to the spreadsheet, the user first "embeds" a SPECTRE "embeddable document" within the spreadsheet worksheet 10. The term "embeddable document" is well known to those skilled in the art, but a brief description will be given here.

An embeddable document is a data structure that includes both data and a reference to a program that manipulates that data. Typically, this program includes functions that allow the user to edit the embeddable document's data, usually in a manner that is particular to the type of data the embeddable document contains. The user may thus edit the embeddable document using the program referenced by the embeddable document. Because embeddable documents are packaged with both data and references to a program for editing and manipulating that data, they may be inserted, or "embedded," within another document, or even another embeddable document. The primary document needs to know nothing about the embedded document; it acts merely as a convenient container for the embedded document. When the user desires to edit the embedded document, the application handling the editing of the primary document turns control over to the program referenced by the embedded document; the referenced program then provides the user with specialized editing functions for the embedded document. For example, a Microsoft® Word™ word processing document may be embedded in a Microsoft® Excel™ worksheet. The embedded Word™ document will contain data representing the text of the document; the text may be edited directly within the worksheet (or indeed any application), using the Microsoft® Word™ program's editing functions. Similarly, in the preferred embodiment of this invention, the SPECTRE embeddable document contains data which represents a circuit model, and references to the SPECTRE program, which allows the user to edit the circuit model directly within the worksheet.

In the preferred embodiment, the SPECTRE embeddable document also contains functions that are callable through the Microsoft® Object Linking and Embedding (OLE) system. Through the OLE system, any other application may call these SPECTRE functions, commanding SPECTRE to, for example, perform, analyses on the circuit model and return the results.

To provide another application with access to these functions, the SPECTRE program must first provide the application with the specifications (i.e., name and arguments) of those functions the application may call. Typically, this is accomplished by first providing the computer's operating system, or a central database, with the program's functional declarations. Any application then learns of those declarations from the operating system or database. In the OLE system, for example, this process is often called "registration": the program first "registers" itself by storing its functional declarations in a central database which is used by the operating system and other programs. When the program is later used by another application, the application learns the names and parameters of the program's callable functions from the central database. The application may then, if necessary, execute an OLE-mediated function call to those functions. Those with skill in the art will appreciate that an OLE-mediated function call can be made through a remote procedure call, as when the function is implemented in a separate executable file; or as a direct function call, as when the function is implemented in dynamically linked library code; or in a variety of other ways, such as through Microsoft® Windows™ messaging. The term "OLE-mediated function call" is intended to encompass all of these meanings, and in addition to encompass equivalent methods for calling the functions of an externally implemented program, under other operating systems. In addition, those with skill in the art will recognize that the terms "function," "procedure," and "method," as used in this specification, are roughly equivalent.

The user typically embeds an embeddable document by directing the application program (in this case, the spreadsheet) to insert a document of the desired type into the current document (or, in this case, the current worksheet). Many applications capable of handling embedded documents, such as Microsoft® Excel™, commonly have a menu command or similar control that simply asks the user what kind of document the user would like to insert. The user is usually asked to select from a list of embeddable document types already known to the operating system.

In the preferred embodiment, the SPECTRE editing functions comprise a text editor which allows the user to edit the text of the file used to create the SPECTRE circuit model. To accommodate this dynamic editing capability, SPECTRE's normal text file parsing functions-those that build the circuit model-are redesigned to accept text from the text editor instead of a text file. The text editor may be easily implemented, as those with skill in the art will appreciate, using a standard text editor class from the Microsoft Foundation Class™ library.

It is necessary to understand, then, that the SPECTRE embeddable document contains both the data corresponding to the circuit model, references to the actual SPECTRE program functions that analyze and manipulate that data, and a reference to the SPECTRE program text editor, which allows the user to edit the SPECTRE document's circuit model. It is also necessary to understand that, for the purposes of this description, the SPECTRE embeddable document and SPECTRE program together comprise the external program 30.

In addition to embedding the SPECTRE document 30, the user must also install an Excel™ "Add-In" module, which contains the definitions of functions and data used to create the transmission and retrieval functions described more fully below. In addition, the "Add-In" module creates and maintains the hidden worksheet 20, which is otherwise inaccessible to the user. As with embedding the SPECTRE document 30, the user installs the "Add-In" module by selecting it from a menu of available modules.

After embedding the SPECTRE document 30 and installing the "Add-In" module, the user may then identify within the worksheet 10 one or more input cells 11, which will contain parameter values for any or all of the SPECTRE document's 30 components. The user performs this identification step using, in the preferred embodiment, an input dialog box 40. The definition for this dialog box 40 is part of the "Add-In" module; the user's interaction with the box 40 is managed by a set of Microsoft® Visual Basic® for Applications (VBA) functions that are also part of the "Add-In" module. A picture of this dialog box 40 is shown, for illustration purposes, in FIG. 2. For convenience, the set of functions that manage the dialog box 40 and its effects will be called "the VBA control code."

Figure 2:
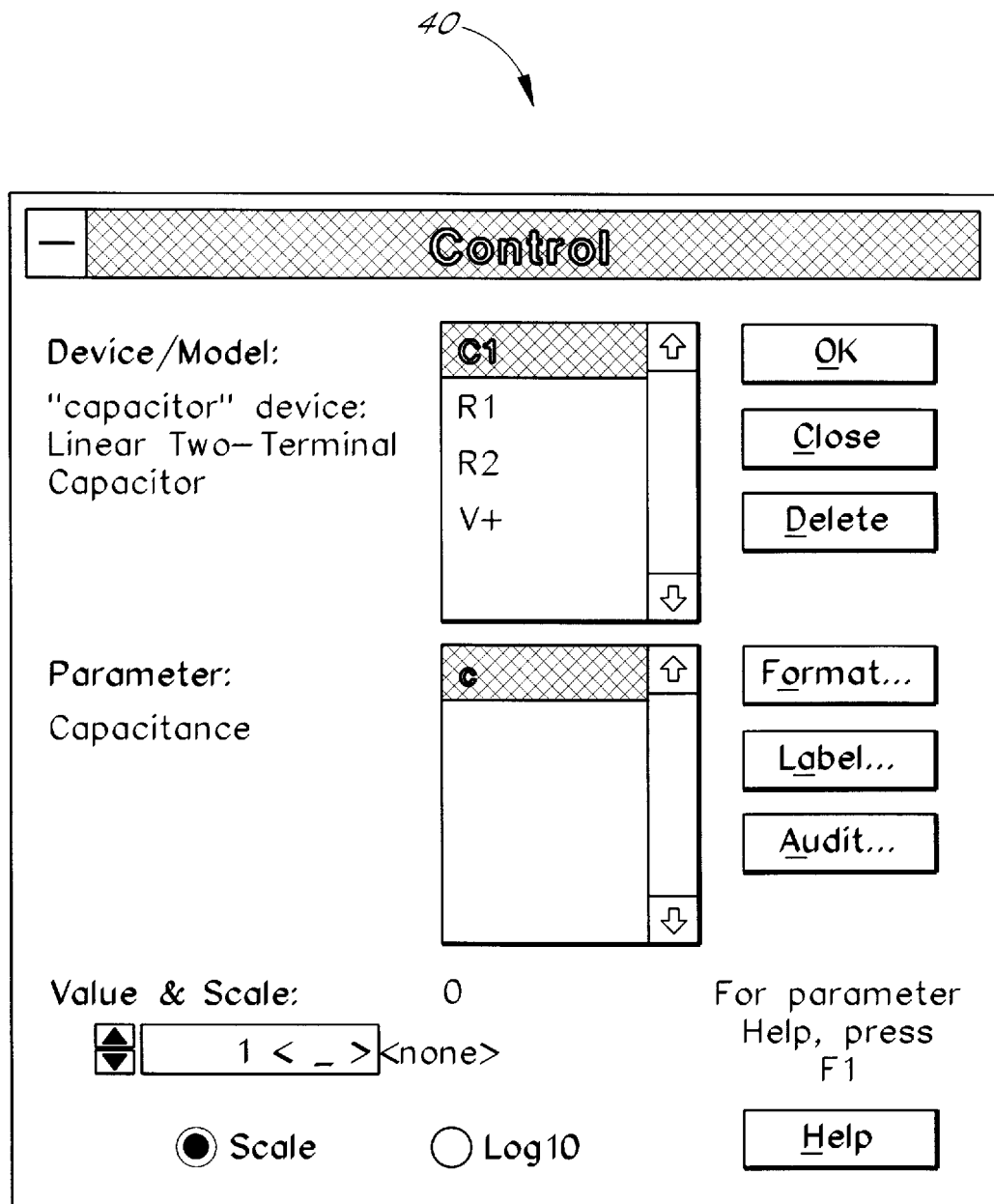
FIG. 2 is an illustration of the dialog box used to link an input cell with a component and parameter of the external program in the preferred embodiment of this invention.

In the preferred embodiment, the input dialog box 40 is designed to be used after the user has first selected a cell to be designated as an input cell 11, typically by selecting it with a mouse or other pointing device. The user then selects a menu item (also created as part of the "Add-In" module) which requests the dialog box 40. The box 40 queries the user for the name of the component in the SPECTRE document to which the cell 11 corresponds, and for the type of parameter controlled by that cell's 11 value. For example, the user might specify that the cell 11 contains the resistance value of resistor R17 in the SPECTRE document. (If the user requests the dialog box 40 before a SPECTRE document 30 has been embedded into the worksheet, the VBA control code performs the courtesy of embedding a SPECTRE document 30 first, if the user agrees.) For convenience, the VBA control code first queries the embedded SPECTRE document 30, through an OLE-mediated function call, to learn what components it contains. The dialog box 40 then presents the user with those components in a "selection box." Similarly, the dialog box 40 presents the user with another selection box to choose which parameter of the selected component the input cell 11 will contain. Finally, the dialog box 40 allows the user to specify whether the value in the input cell 11 is to be scaled (either linearly or logarithmically) by a predetermined amount. In this manner, the input cell 11 can contain, for example, resistor values measured in kilohms rather than ohms. If the user attempts to assign an input cell 11 to a component parameter that is already controlled by another input cell 11, the dialog box 40 offers the user the choice of canceling his request, or replacing the old controlling input cell 11 with the new controlling input cell 11. As can be appreciated, it is not possible for two input cells 11 to control the same parameter of the same component. FIG. 2 clearly illustrates these features of the dialog box 40.

The VBA control code then creates, for each input cell 11 identified, a transmission cell 21 on the hidden worksheet 20. As shown in FIG. 1, the transmission cell 21 contains a transmission function. In the preferred embodiment, the dialog box macro implements the transmission function by installing into the transmission cell 21 an Excel™ "name" which refers to an Excel™ "named macro." This "named macro" is defined to contain the transmission function as its macro definition. The named macro is created and maintained by VBA code in the Excel™ "Add-In" module added earlier.

The VBA control code creates each new transmission cell 21 within a contiguous range on the hidden worksheet 21. For reasons which will become clear later, the VBA control code also creates and maintains a single cell at the top left of the hidden worksheet 20, which contains a "Sum" function referencing all of the transmission cells 21 thus far created. To use the example above, if the user has specified three component input cells 11, the VBA control code will have created a "summation" cell at the top left of the hidden worksheet 20, containing the function =Sum(A2:A4)

where the three transmission cells 21 are located in column A, rows 2 through 4. If the user specifies another input cell 11, the VBA control code will create the corresponding transmission cell 21 at location A5, and change the summation cell to reference the range A2 through A5.

The named macro contains a call to a VBA function having five arguments: the name of the circuit component to be altered; the parameter to be altered; the location of the input cell 11 containing the new value; and a scaling value and a flag that determines whether the value in the input cell is scaled linearly or logarithmically by the scaling value (see the description of the dialog box 40 above). Thus, for example, where the user specifies that cell B6 will contain the resistance for component R17, scaled logarithmically by a factor of 1000, the VBA control code will create a transmission cell 21 containing a "name" reference to a macro calling the function =SpxlAlter("R17", "resistance", B6, 3, TRUE ).

As an example, the VBA code for this function is shown below. This code is also part of the code contained in the Excel™ "Add-In" module earlier installed by the user. (The trailing underscore on some lines indicates that the text of that line continues on the next line.)

```
Public Function SpxlAlter( Value As Variant, Device$, Param$, ScaleIdx %, _
        LogFlag As Boolean) As Variant
' (comment: this function scales Value, then sends it to SPECTRE along with
' the Device and Param arguments.)
        On Error GoTo bad
        Dim newvalue#
        If LogFlag Then
                newvalue = Application.Power( 10#, Value.Value)
        Else
                newvalue = Value.Value * ScaleVal( ScaleIdx / 3 + 1 )
        End If
        SpxlAlter = GetCktObj(Value.Parent).AlterValue( Device, Param, _
                new value)
        Exit Function
bad:
        SpxlAlter = Empty
End Function
```

When executed, the SpxlAlter( ) function will first scale the input cell's 11 value as desired (note that linear scaling is accomplished by looking up the true scale factor from a table, called ScaleVal, using the value passed in the function as an index into the table). The SpxlAlter( ) function then makes an OLE-mediated function call to the SPECTRE program 30, commanding it to alter the specified parameter value of the named component, in the SPECTRE document 30. The OLE-mediated function call is the transmission function; it occurs at the line SpxlAlter=GetCktObj(Value.Parent).AlterValue( . . . ).

As discussed below, the GetCktObj( ) function identifies the SPECTRE document 30 corresponding to the current worksheet 10. The AlterValue( ) method is an OLE-callable function of the SPECTRE program 30. When AlterValue( ) is called, the SPECTRE program 30 updates the internal "evaluation model" of the SPECTRE document 30 to reflect the value for the specified component and parameter.

Because the transmission function contains, as one of its arguments, a reference to the input cell 11, the spreadsheet evaluation sequencer will automatically schedule the transmission function for evaluation whenever the value in the input cell 11 changes. Thus, the user is assured that if any input value to the SPECTRE circuit model changes, it will be transmitted automatically by the spreadsheet program to the SPECTRE document 30.

Although a true transmission function is used in the preferred embodiment-that is, the transmission function actually sends the appropriate input data to the external program 30—it is of course possible to achieve the effect of this transmission function in other, equivalent ways. For example, this system could be implemented using instead a "notification function" instead of a transmission function. The notification function would simply warn the external program 30, through an OLE-mediated function call, that the input data has changed. The external program 30 could then, either immediately, or just before output data is requested, interrogate the spreadsheet for the updated input data.

Figure 4:
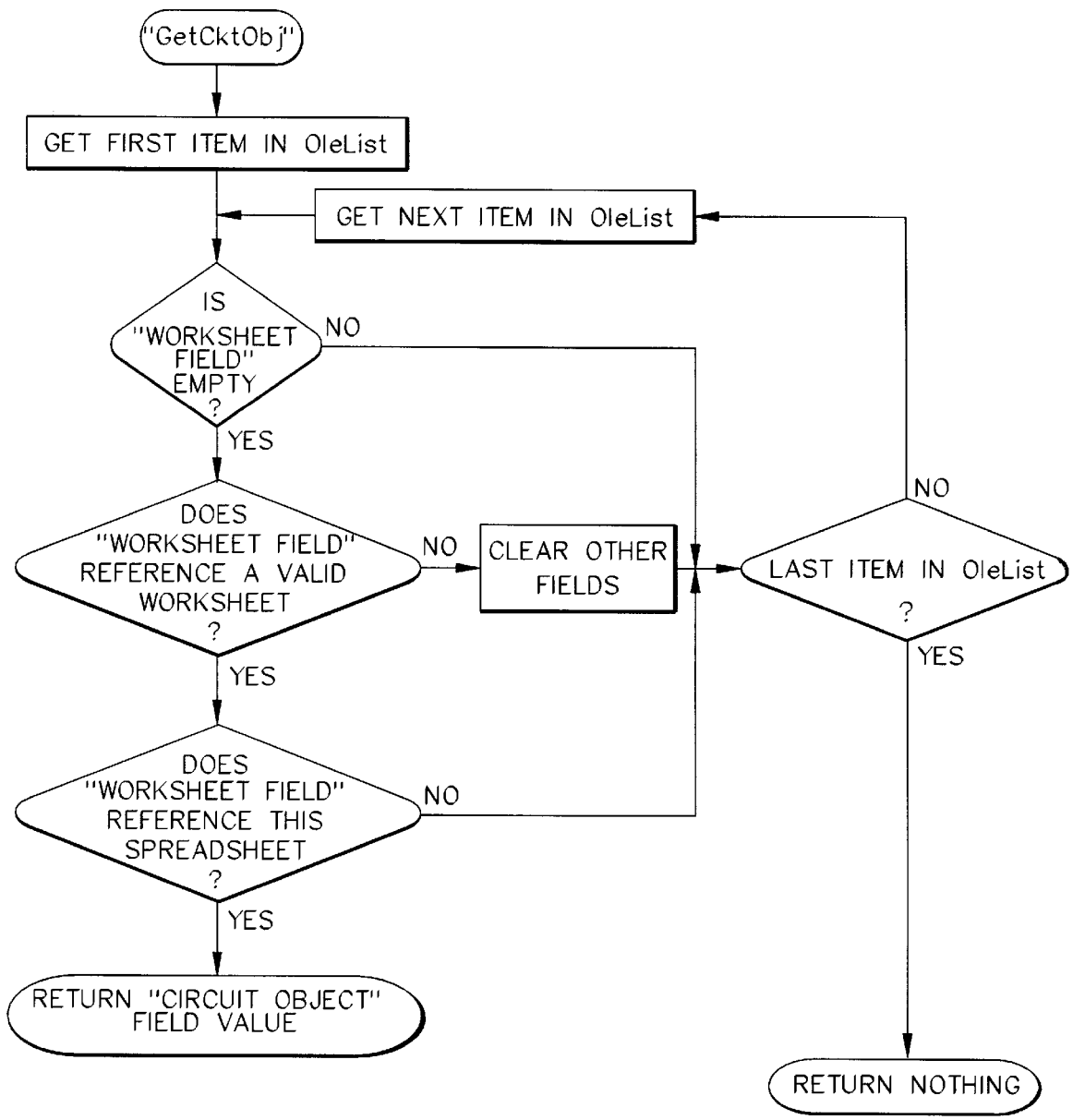
FIG. 4 is a block diagram describing the procedure followed by the GetCktObj( ) function in locating the SPECTRE object associated with the current worksheet, in the preferred embodiment of this invention.

In order to transmit the new input data to the appropriate SPECTRE document 30, the transmission function must determine which SPECTRE document 30 is associated with the current worksheet 10. In the preferred embodiment, the transmission function achieves this by looking up the identity of the appropriate SPECTRE document 30 from a data structure, called the OleList, created and maintained by the VBA code installed in the "Add-In" module. (As an alternative, of course, the transmission function could take as an extra parameter the name of, or a reference to, the SPECTRE document 30, but this requirement would shift the burden to the user.) Each time a new a new worksheet containing a SPECTRE document 30 is opened, and each time a SPECTRE document 30 is added to a worksheet, the VBA code creates a new entry in the OleList, which identifies (1) the worksheet; (2) the SPECTRE document 30; and (3) the range of transmission cells 21 on the hidden worksheet. (In the preferred embodiment, the user may embed only one SPECTRE document 30 per worksheet 10; this saves the user the trouble of identifying, in each of his output retrieval functions, which of several circuit models he wishes analyzed. It is of course possible, however, that in other embodiments the user could be allowed to integrate with the worksheet 10 more than one external program 30, whether all of the same type, or of different types.) When the transmission function needs to send data to the SPECTRE document 30, then, it identifies the SPECTRE document 30 belonging to its worksheet 10 by calling the GetCktObj( ) function, shown in the code above on the line beginning "SpxlAlter=". The GetCktObj( ) function searches the Ole-List for the SPECTRE document 30 associated with the worksheet 10. Along the way, the GetCktObj( ) function also performs some housekeeping: if it discovers an entry in the OleList corresponding to a SPECTRE document that is associated with a worksheet that has been closed, it deletes the entry from the OleList. The procedure followed by the GetCktObj( ) function is shown in FIG. 4. Advantageously, maintaining in the OleList a list of OLE references to active SPECTRE documents also prevents Excel® from deactivating (removing from active memory) the SPECTRE documents. (Under the OLE system, so long as an application keeps a reference to a OLE document, it will not deactivate the document.) If these embeddable documents were removed from active memory, they would need to be reloaded each time they were called, potentially causing significant delays in execution.

The values contained in the input cells 11 may be input directly by the user, or they may be the results of functions contained in those cells 11, or they may be the results of functions external to those cells 11 which install values in the cells 11. For example, the value in an input cell 11 may be generated by a function such as the Microsoft® Excel™ "Table" function, which iteratively increments the value in a cell by a predetermined amount and then recalculates the worksheet after each iteration. In another example, the value in an input cell 11 may be generated by a goal-seeking or optimizing function such as the Microsoft® Excels™

"Solver" tool, which iteratively alters the value in a cell and then recalculates the worksheet after each iteration, in an attempt to reach a predetermined result. In any case, whenever the value in the input cell 11 changes, the spreadsheet evaluation sequencer will ensure that its corresponding transmission cell 21 is evaluated, causing the appropriate transmission function to send the updated value information, for a component and parameter, to the SPECTRE object.

To obtain the results of a SPECTRE analysis, the user then inserts a retrieval function into one or more retrieval cells 12 in the worksheet 10. (Of course, the user could also put the retrieval function in a macro, or in a non-cell location within the worksheet. For purposes of this discussion, however, it is assumed that the retrieval function is located within a retrieval cell 12.) The retrieval function will identify the node of the SPECTRE document 30 to be analyzed and the type of analysis desired. For example, the function =DC("input")

might request the DC voltage at the input node of the SPECTRE circuit model. Of course, the retrieval function may comprise only part of the function in the retrieval cell 12. For example, the cell function =(DC("vcc")/2)–DC("output")

would calculate the voltage by which the "output" node deviates from one-half the "vcc" voltage.

Like the code containing the transmission function, the retrieval function is preferably written as a VBA function. In the preferred embodiment, for example, the retrieval function "DC" is written as the VBA function shown below. (Like the transmission function code, this code is part of Excel™ "Add-In" module earlier installed by the user.)

```
Public Function DC( ItemName$) As Variant
' (comment: this function returns bias-point value from circuit evaluation)
        Dim wks As Worksheet, ckt As Object, rng As Range, item
        As Variant
        Application. Volatile
        DC = Empty
        On Error GoTo bad
        Set wks = Application.Caller.Parent
        Set ckt = GetCktObj( wks )
        If Not (ckt Is Nothing) Then
                Set rng = GetRngObj( wks )
                item = rng.Cells(1).Value
                DC = GetCktObj( wks ).EvalDC( ItemName )
        End If
        Exit Function
bad:
End Function
```

When executed (as discussed below), the retrieval function will make an OLE-mediated function call to the SPECTRE program 30, commanding it to return the specified output data for the embedded SPECTRE document 30. The OLE-mediated function call occurs at the line DC=GetCktObj(wks).EvalDC(ItemName).

As discussed earlier, the GetCktObj( ) function identifies the SPECTRE document 30 associated with the worksheet 10, by looking it up in the OleList created and maintained by the VBA code in the "Add-In" module. The EvalDC( ) method, then, is an OLE-callable function of the SPECTRE program 30.

In order to force evaluation of the retrieval function, the function is declared "volatile": such functions are always evaluated whenever any value in the spreadsheet changes. Furthermore, to ensure that the retrieval function is evaluated after all of the transmission functions (and thus to ensure that the external program operates on current input data), the retrieval function contains a dummy reference to the special "summation" cell described above. The reference is contained in the line item=rng.Cells(1).Value.

The range of cells returned by the "rng" variable is the range of transmission cells 21 on the hidden worksheet. This range is located by the GetRngObj( ) function, which searches the OleList data structure, described above. The GetRngObj( ) function operates in a manner similar to the GetCktObj( ) function. Because the summation cell depends upon all of the transmission cells 21, Excel™ will delay further execution of the retrieval function until all of the transmission cells 21 have been evaluated. Since the actual request for output data does not occur until the line DC=GetCktObj(wks).EvalDC(ItemName)

the user can be assured that the external program 30 does not return any output data until all new input data has been transmitted to it.

Figure 3:
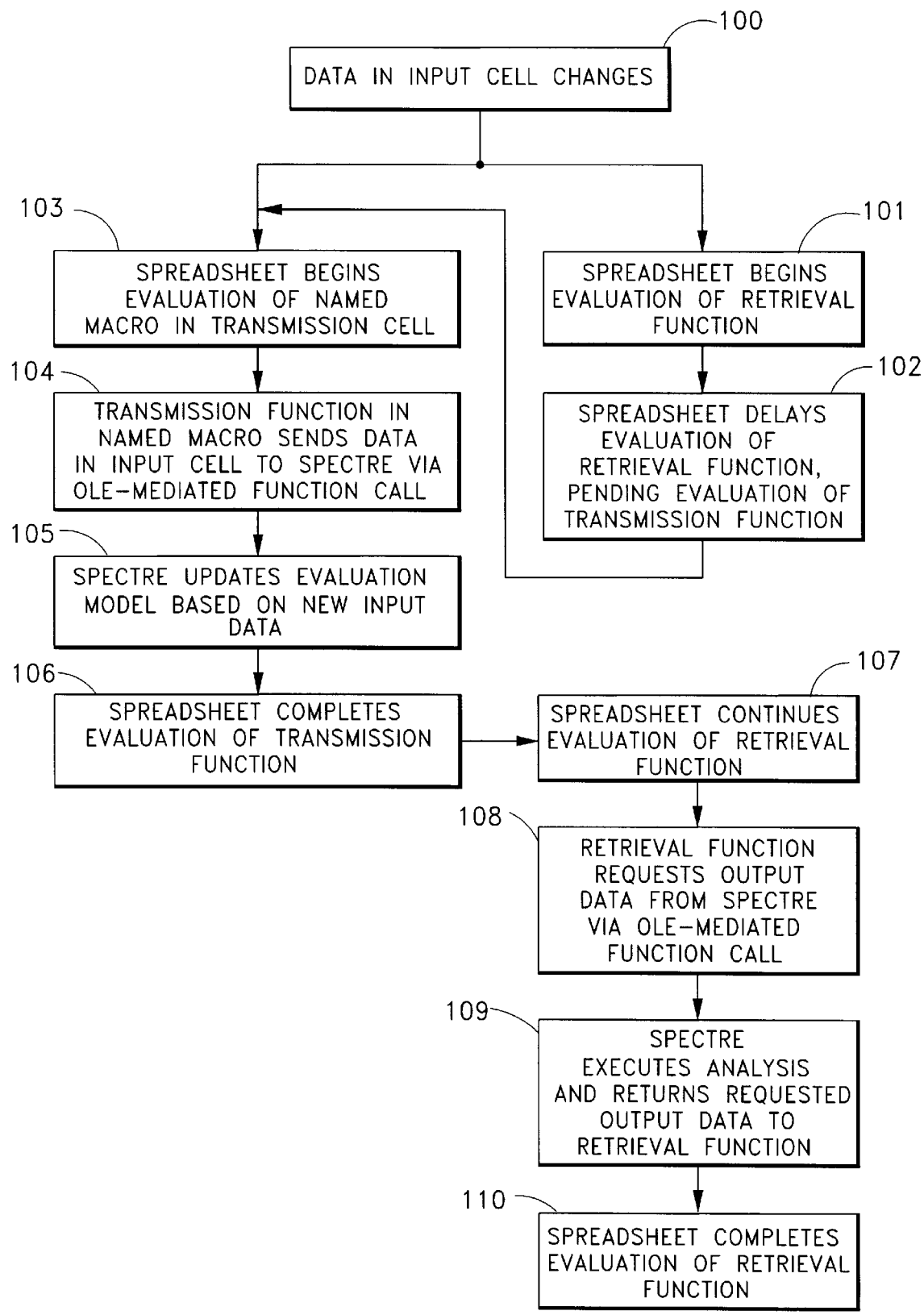
FIG. 3 is a block diagram showing the procedure for transmitting new input data to, and receiving new output data from, the external program in the preferred embodiment of this invention.

As a summary, then, FIG. 3 illustrates the procedure followed when data in an input cell 11 changes. At step 100, the value in the input cell 11 changes—whether because the user changes it, or because a spreadsheet function, tool, or other system changes it. Because the transmission function in the transmission cell 21 depends upon the changed input cell 11, the spreadsheet evaluation sequencer schedules the named macro in the transmission cell 21 for evaluation. In addition, because the retrieval function in the retrieval cell 12 is "volatile," the spreadsheet evaluation sequencer schedules the retrieval function for evaluation. At this point, represented in FIG. 3 by the unlabeled circle dividing the arrows between step 100 and steps 101 and 102, either function could be scheduled for evaluation first. Assuming for the moment that the retrieval function is scheduled first, the spreadsheet program begins evaluation of the retrieval function at step 101. Because, however, the retrieval function contains a reference to the transmission function (note that this reference is, in the preferred embodiment, a reference to the "summation" cell, which in turn refers to all transmission cells 21, which contain the transmission functions), the spreadsheet delays further evaluation of the retrieval function, at step 103, until the transmission function is evaluated. The spreadsheet then begins evaluation of the named macro reference in the transmission cell 12 function, at step 102. (Of course, step 102 could have been scheduled first, rendering step 103 unnecessary.) In evaluating the named macro, at step 104, the spreadsheet program executes the macro's OLE-mediated function call (the transmission function) to the external program 30, which transmits the input data corresponding to the transmission function's referenced input cell 11. The external program 30 then, in carrying out the called function, updates its evaluation model based on the new input data, at step 105. (Of course, if a notification function were used instead of a transmission function, the external program 30 might merely make a temporary note that the input data in the input cell 11 had changed, and remember to retrieve that data from the spreadsheet before fulfilling any output requests.) Finally, the spreadsheet completes evaluation of the transmission function at step 106, and evaluation of the retrieval function resumes at step 107. The spreadsheet then, in evaluating the retrieval function at step 108, executes that function's OLE-mediated function call to the external program 30, requesting output data. In response, the external program performs whatever analysis is necessary (if the evaluation model has not changed, for example, SPECTRE need not perform any new analysis), and returns the requested output, at step 109. The spreadsheet completes evaluation of the retrieval function, at step 110, and then carries on with evaluating the rest of the worksheet.

Modifying SPECTRE

In order to provide functional access to the SPECTRE program 30 in the preferred embodiment of this invention, it is necessary to modify the original SPECTRE program (as distributed by the Electrical Engineering and Computer Science (EECS) department of the University of California at Berkeley) to handle the input and output requests made by, for example, the AlterValue( ) and EvalDC( ) functions. In addition, it is desirable to add to the SPECTRE program maintenance functions such as those that return the components and parameters of the current circuit model (for use with, for example, the input dialog box 40). Furthermore, these input, output, and maintenance functions must have Microsoft OLE-compliant interfaces, so that they may be accessed through OLE-mediated function calls.

The new, spreadsheet-interactive SPECTRE program 30 differs from the old, text-file driven SPECTRE program in that the new SPECTRE program 30 acts more as a body of functions, callable by the spreadsheet, than as an active program. In the original SPECTRE program, the circuit model is created, modified, and evaluated according to sequential commands listed in a text file. The SPECTRE program starts, is given the name of the text file, executes the commands in the text file, and stops. Early commands in the text file, for example R17 input ground resistor r=1K identify the components and connections that comprise the circuit model. As SPECTRE encounters these commands, it constructs its internal model of the circuit. Later commands, for example dcPoint DC start=3 stop=3 sweep=vcc lin=1 then direct SPECTRE to analyze the model and produce output data; and still later commands, for example setRes alter dev=R17 param="r" value=2000 instruct SPECTRE to change certain component's parameters. (These "alter" commands are then followed by more commands to analyze the altered model.) SPECTRE's output data is usually written to a data file; the user reviews the output using a separate "viewer" program.

In the new SPECTRE program 30, by contrast, the text file is used only to build the circuit model. It is created and updated by the user, using the SPECTRE program's 30 text editor. The text in the text editor will contain only "circuit building" commands, such as R17 input ground resistor r=1K The commands for altering component parameters and requesting analysis and output data are replaced by OLE-mediated function calls to original SPECTRE program functions such as "AlterValue," "EvalAC," and "EvalDC." As those with skill in the art will appreciate, no modification of these functions is required. They are called, however, directly through OLE-mediated function calls, instead of by the original SPECTRE "command parser" subroutine.

It is of course necessary, however, to provide an OLE-compliant set of functional declarations, to enable OLE-mediated function calls to the SPECTRE program 30. For convenience and as an example for other embodiments, these declarations (in the Microsoft® "Object Description Language") are provided below.

```
dispinterface Circuit
{
properties:
    [id(0x1), helpstring("Quad-byte ASCII code for application")]
        VARIANT Creator;
    [id(0x2), helpstring("Name of circuit")]
        VARIANT Name;
    (id(0x3), helpstring(" ")]
        VARIANT Parent;
    [id(0x4), helpstring("Current status and error information")]
        VARIANT Status;
methods:
    [id(0x5), helpstring("Alter a parameter's value")]
        VARIANT AlterValue(
            [in] VARIANT Device,
            [in] VARIANT Param,
            [in] VARIANT newValue);
    [id(0x6), helpstring("Application name")]
        VARIANT Application;
    [id(0x7), helpstring("Device/model/parameter information")]
        VARIANT Detail(
            [in] VARIANT Device,
            [in] VARIANT Param);
    [id(0x8), helpstring("Initiate an AC evaluation")]
        VARIANT EvalAC(
            [in] VARIANT Item,
            [in] VARIANT FreqHz);
    [id(0x9), helpstring("Initiate a DC evaluation")]
        VARIANT EvalDC(
            [in] VARIANT Item);
    [id(0xA), helpstring("Initiate a spectral evaluation")]
        VARIANT EvalHB(
            [in] VARIANT Item,
            [in] VARIANT FundHz,
            [in] VARIANT Harm1);
}
```

Figure 5:
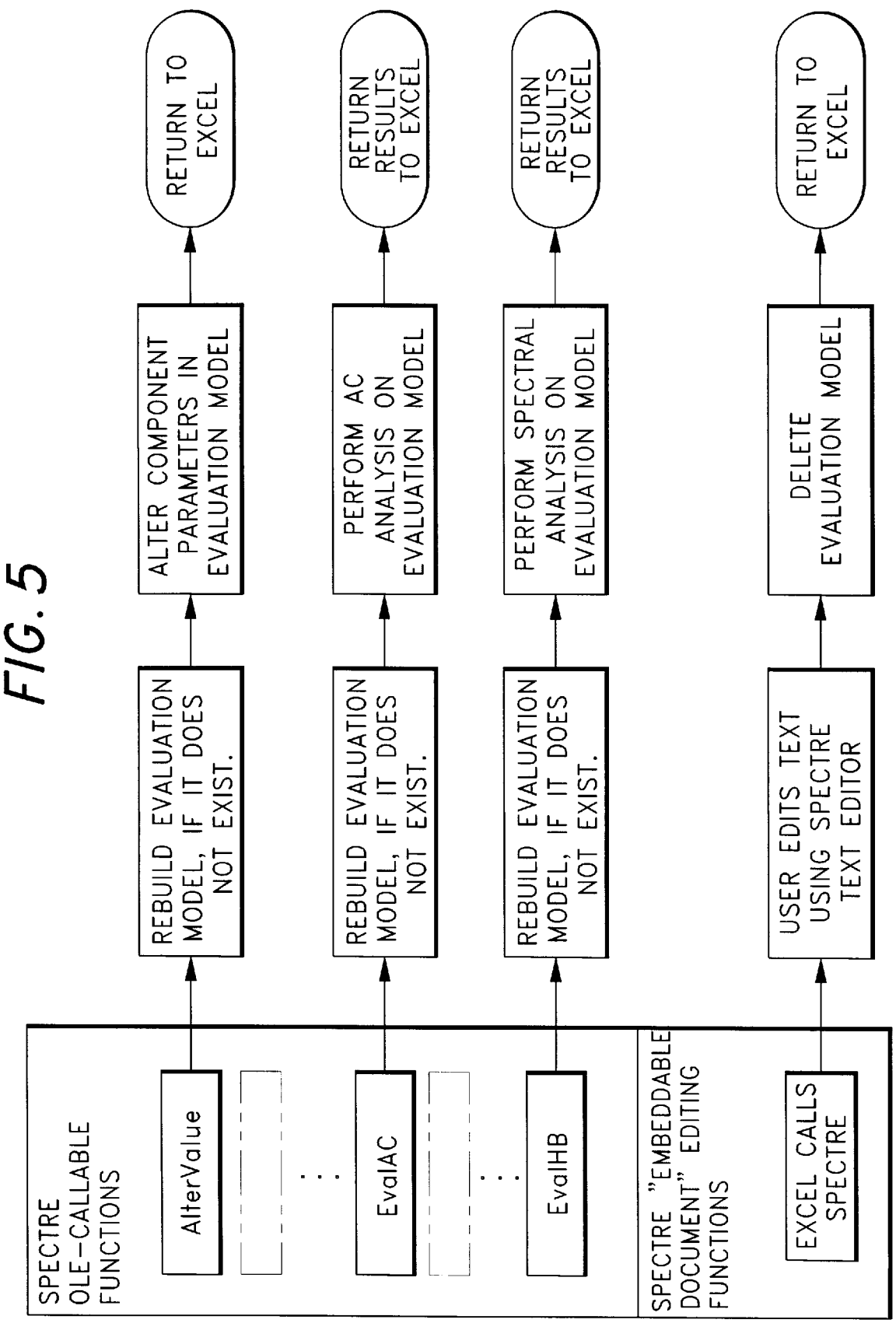
FIG. 5 is a block diagram showing the functions of the SPECTRE object in the preferred embodiment of this invention.

FIG. 5 is a schematic of the SPECTRE program's 30 functions: Note that each function has an OLE-compliant entry point and exit point, allowing these functions to be called, as needed, by the spreadsheet (or indeed any other OLE-enabled application).

Because the SPECTRE circuit model description is contained in a text editor, the circuit description may be changed by the user directly within the spreadsheet. Since it is possible, then, that the user may change the circuit description between calculations, the SPECTRE program 30 must ensure that it rebuilds the evaluation model anytime the user changes the circuit description, before any analysis is performed. For this reason, whenever the user has changed the text in the SPECTRE text editor, the SPECTRE document 30 deletes its evaluation model. As FIG. 5 shows, then, before any other function requiring the evaluation model can fully execute, it must rebuild the evaluation model, using the current text from the text editor. In this way, the user is assured that any analyses are performed on the circuit model currently described in the text editor.

Other Embodiments

Although in the preferred embodiment the transmission functions are implemented as named macros that are referenced by names on the hidden worksheet, it is of course possible that the transmission functions (or, as discussed above, notification functions) be located in other places, and yet still accomplish the objectives of this invention. Indeed, it is possible to place the transmission functions within the retrieval functions, so that they activate immediately before any output is requested from the external program 30. In such a case, one or more transmission function calls such as =SpxlAlter("R17", "resistance", B6)

would precede the ultimate retrieval request

DC=GetCktObj(wks).EvalDC(ItemName), ensuring that transmission of the input data would precede the request for evaluation and output.

In addition, it is contemplated by the inventor that many other types of input dependent external programs—mechanical or financial simulators, for example, or test-and-measurement programs that control sensor devices and measure their output—can be linked to a spreadsheet by the system and method of this invention. Indeed, even an active control system for a laboratory experiment or a manufacturing plant could be implemented through a spreadsheet, using this invention. In some cases, moreover, the "external program" could actually consist of two or more programs: a first program, for example, accepting input from the spreadsheet and controlling some device; and a second program taking measurements from a sensor and returning the information to the spreadsheet (which could then use the information to control the device, through the first external program).

Although one particular embodiment of this invention, i.e., the integration of the SPECTRE circuit simulator with the Microsoft® Excel™ spreadsheet, has been disclosed, other types of external programs can be integrated with types of spreadsheet programs, through this invention. Clearly, therefore, this invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

I claim:

1. A system for integrating a spreadsheet program and an external program comprising:
    an input cell in said spreadsheet, said input cell containing data used as input by said external program;
    a transmission function containing a reference to said input cell, such that said spreadsheet automatically schedules evaluation of said transmission function as part of normal spreadsheet operation if said input cell is changed, said transmission function transmitting the data from said input cell to said external program; and
    a retrieval function containing a reference to said transmission function, such that said spreadsheet automatically schedules evaluation of said retrieval function to occur after evaluation of said transmission function, said retrieval function as part of normal spreadsheet operation retrieving output data from said external program, said output data calculated by said external program based upon said input data from said spreadsheet.

2. The system of claim 1, wherein said transmission function refers indirectly to said input cell.

3. The system of claim 1, wherein said retrieval function refers indirectly to said transmission function.

4. The system of claim 1, wherein said transmission function is implemented within said spreadsheet program.

5. The system of claim 1, wherein said transmission function is contained within a cell in a worksheet within said spreadsheet program.

6. The system of claim 1, wherein said transmission function is contained within a cell in a hidden worksheet within said spreadsheet program.

7. The system of claim 1, wherein said retrieval function is implemented within said spreadsheet program.

8. The system of claim 1, wherein said retrieval function is contained within a cell in a worksheet within said spreadsheet program.

9. The system of claim 1, wherein said transmission function is called as an Object Linking and Embedding Automation method of said external program.

10. The system of claim 1, wherein said retrieval function is called as an Object Linking and Embedding Automation method of said external program.

11. The system of claim 1, wherein said external program is input dependent.

12. The system of claim 1, wherein said external program is an electrical circuit simulator program.

13. The system of claim 1, wherein said transmission function also transmits additional information regarding said input cell to said external program.

14. The system of claim 1, wherein said external program is implemented, in part, as an embeddable document within said spreadsheet.

15. A method for providing spreadsheet-style interface and control for an input dependent external program, comprising the steps of:
    providing a spreadsheet containing input data for use by said program;
    making a first function call from said spreadsheet program to said external program, said first function call made automatically by said spreadsheet as part of normal spreadsheet operation, said first function call transmitting said new input data to said external program; and
    making a second function call from said spreadsheet program to said external program, said second function call automatically occurring after said first function call as part of normal spreadsheet operation, said second function call retrieving output data from said external program, said output data calculated by said external program in response to said input data from said spreadsheet.

16. The method of claim 15, wherein said first function call is originated from a cell in a worksheet within said spreadsheet program.

17. The method of claim 15, wherein said second function call is originated from a cell in a worksheet within said spreadsheet program.

18. The method of claim 15, wherein said first function call is executed by calling an Object Linking and Embedding Automation method of said external program.

19. The method of claim 15, wherein said second function call is executed by calling an Object Linking and Embedding Automation method of said external program.

20. The method of claim 15, wherein said external program is input dependent.

21. The method of claim 15, wherein said external program is implemented, in part, as an embeddable document within said spreadsheet.

22. A system for integrating a spreadsheet program and an external program, comprising:
    an input cell in said spreadsheet, said input cell containing data used as input by said external program;
    a notification function containing a reference to said input cell, such that said spreadsheet automatically schedules evaluation of said notification function as part of normal spreadsheet operation if said input cell is changed, said notification function notifying said external program that the data from said input cell has changed;
    a retrieval function containing a reference to said notification function, such that said spreadsheet automatically schedules evaluation of said retrieval function to occur after evaluation of said notification function, said retrieval function retrieving output data from said external program as part of normal spreadsheet operation, said output data computed by said external program in response to said input data from said spreadsheet.

23. The system of claim 22, wherein said notification function is called as an Object Linking and Embedding Automation method of said external program.

24. The system of claim 22, wherein said external program is input dependent.

25. The system of claim 22, wherein said notification function also transmits additional information regarding said input cell to said external program.

* * * * *